Apr. 3, 1923.

E. E. CLARK.
DRY PIPE VALVE.
FILED JUNE 29, 1921.

Inventor.
Ezra E. Clark
by Heard Smith & Tennant.
Attys.

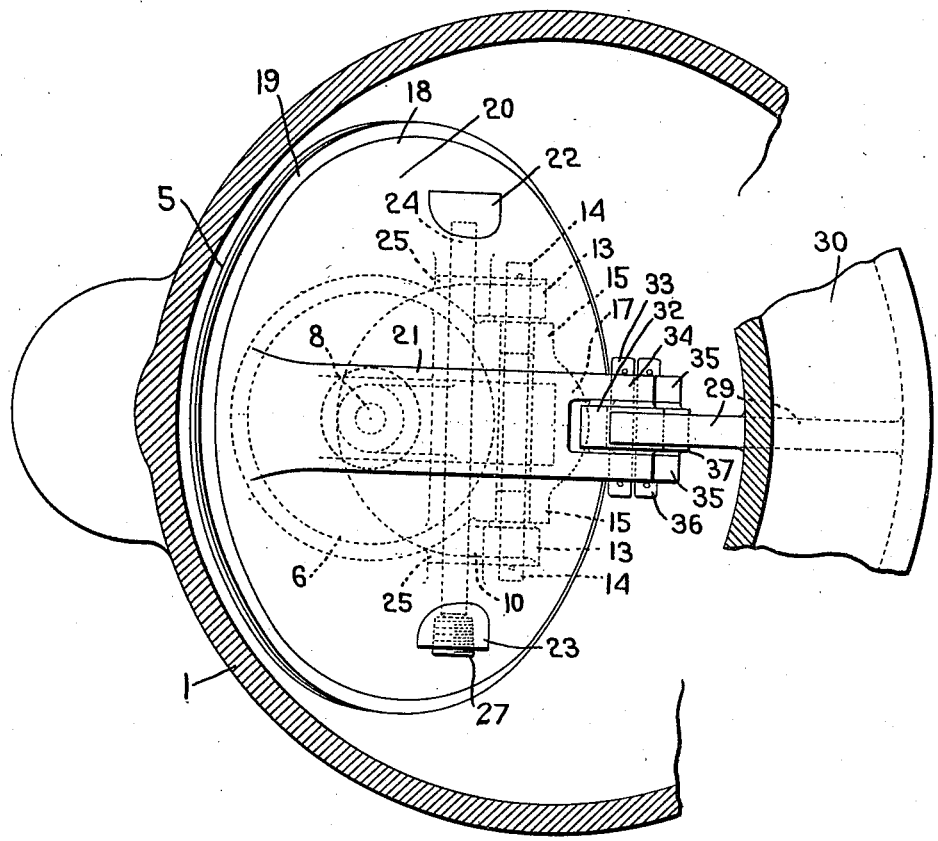

Patented Apr. 3, 1923.

1,450,428

UNITED STATES PATENT OFFICE.

EZRA E. CLARK, OF NEWTONVILLE, MASSACHUSETTS.

DRY-PIPE VALVE.

Application filed June 29, 1921. Serial No. 481,258.

*To all whom it may concern:*

Be it known that I, EZRA E. CLARK, a citizen of the United States, and resident of Newtonville, county of Middlesex, State of Massachusetts, have invented an Improvement in Dry-Pipe Valves, of which the following description, in connection with the accompanying drawing, is a specification, like characters on the drawing representing like parts.

This invention relates to novel improvements in dry pipe valves such as are used in connection with sprinkler systems. Valves of this general type include a water valve and an air valve and are so constructed that the pressure of the air contained in the sprinkler system will hold the water valve closed against the pressure of the water in the supply pipe. These dry pipe valves are so constructed that a lesser air pressure will hold the water valve closed against a greater water pressure. In the present invention this is accomplished by employing valves of the differential type in which the air valve is of greater area than the opposed water valve.

One of the objects of the invention is to provide a dry pipe valve of relatively simple and economic construction which will be compact, efficient and easily assembled.

Another object of the invention is to provide a dry pipe valve having a water valve seat and an air valve seat arranged in angular relation to each other and mounted to swing upon opening about a point equidistant from the axes of both valves when the latter are in seated position. This is accomplished in the preferred embodiment herein by mounting one of the valves upon an arm which is pivotally mounted upon the casing and pivotally connecting the other valve to the arm, the relation of the valves being such that when seated the axes of the valves are equidistant from the axis of the pivot of said arm.

A further object of the invention is to provide a construction in which the links and levers usually employed in dry pipe valve constructions are eliminated and a relatively simple construction produced in which the valves are carried by a single arm and the air valve is guided into open position preferably by guide ways or tracks upon the valve casing.

A further object of the invention is to provide a dry pipe valve structure from which the valves can be readily withdrawn by simply removing a closure at the side of the casing.

A further object of the invention is to provide a dry pipe valve with a convergingly tapered inlet which will permit the use of a relatively small water valve without interfering with the free delivery of a sufficient amount of water to supply the sprinkler system, the reduction in the area of the water valve thereby making possible a reduction in the size of the general valve structure.

Other objects and features of the invention will more fully appear from the following description and the annexed drawings and will be pointed out in the claims.

In the drawings:

Fig. 2 is a sectional view, partly broken away, looking downwardly in planes indicated by the broken line 2—2, Fig. 1.

Figure 1:
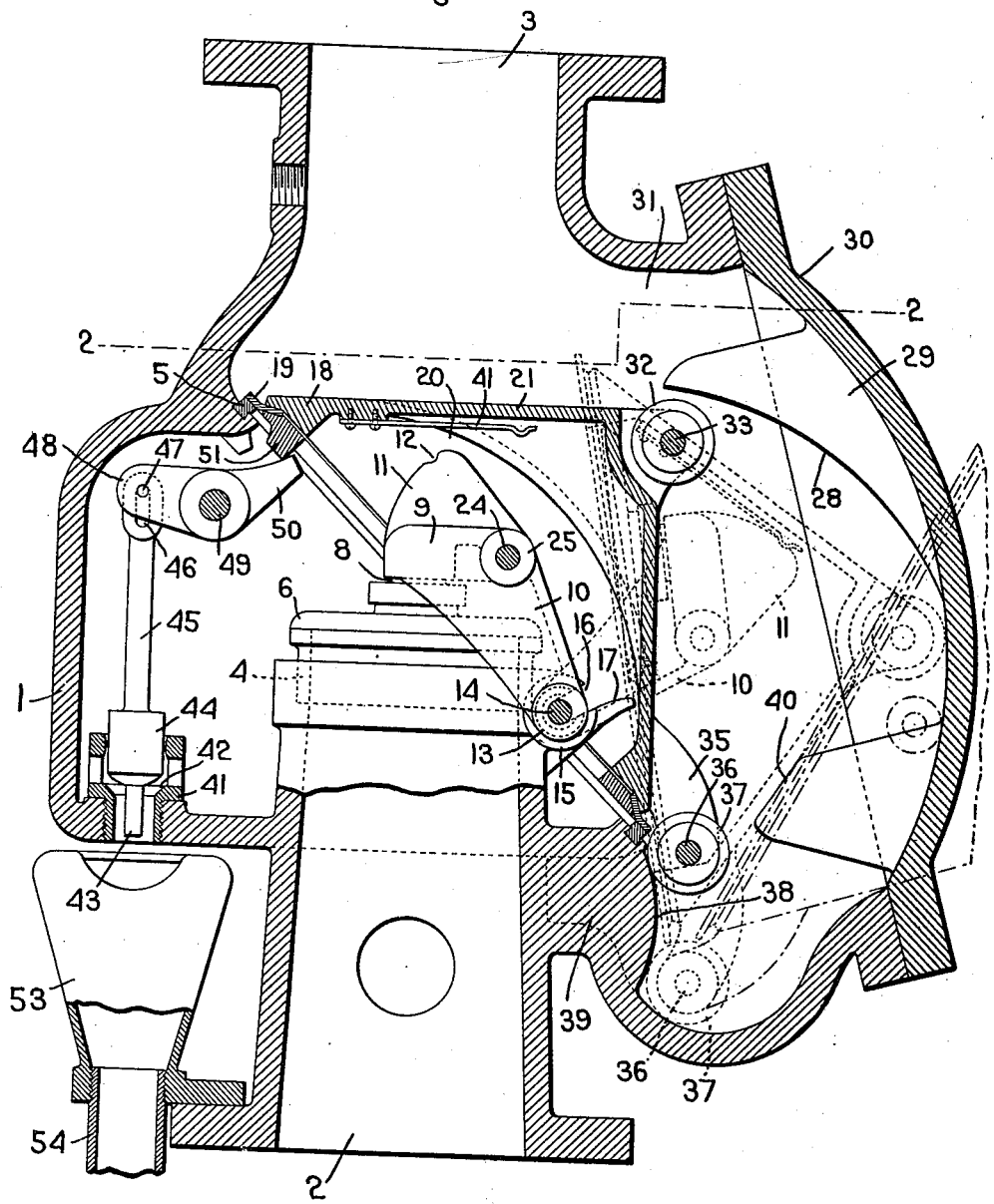
Fig. 1 is generally a vertical longitudinal median sectional view of a dry pipe valve embodying my construction, certain of the parts, however, being shown in elevation.

A preferred dry pipe valve construction embodying my invention, which is disclosed in the accompanying drawing, comprises a body portion 1, of generally cylindrical form, having an inlet passage 2, preferably slightly conically converging and extending into the body portion 1 and an outlet 3 extending from said body portion preferably in alinement with the inlet passage. The upper end of the inlet passage desirably is provided with a valve seat 4 and an air valve seat 5 desirably extends diagonally across the body portion preferably in a plane at about a forty-five degree angle to the axis of the inlet passage. A water valve 6 may be of the usual form to close the end of the inlet passage and properly engage the seat 4 thereof. It desirably is connected by a swiveled joint 8 to the end portion 9 of an arm 10 which preferably is in the form of a hood of sufficient breadth to enclose a portion of the water valve 6 and the swiveled joint 8. The upper end of the arm 10 desirably is provided with a relatively thin web 11 having a sector-shaped end provided with a notch or recess 12, the purpose of which will hereinafter be described. The lower end of the hood-shaped arm 10 is provided with bosses 13 which receive a pivotal shaft 14 which is journaled in a bearing in a boss 15 which extends laterally from the end portion of the inlet passage 2.

The bearing preferably is provided with an open side or slot 16 to permit the shaft to be readily introduced into the bearing and the boss 15 desirably is provided with a preferably curved extension 17 which acts as a guide-way for the shaft 14 when the parts are being assembled in operative position. The water valve is thus mounted to swing about the pivotal shaft 14 from its closed position to open position.

In the preferred construction disclosed herein the air valve 18 preferably is of circular form and of considerably greater area than the water valve. The perimeter of the air valve is provided with a circumferentially projecting flap or ring washer 19 of suitable flexible material, such as rubber, which will insure an air-tight connection with the valve seat 5.

The body portion 20 of the air valve preferably is crowned or of general hemispherical shape and is provided centrally with an offset, preferably diametrically extending integral housing 21 of sufficient width to accommodate the end portion of the web 11 when the valves are swung to open position.

The air valve 18 desirably is pivotally mounted upon the arm 10. In the preferred construction illustrated herein the body portion 20 of the air valve is provided with laterally extending bosses 22 and 23 which provide seats or journals for the ends of a shaft 24 which passes through a suitable journal 25 in the arm 10. In order to permit the introduction of a shaft a hole is bored through the boss 23 and the wall of the casing 20, and an alined hole is also bored through the casing 20 into but not through the boss 22. The journal 25 is in alinement with the holes in the bosses 22 and 23. The shaft 24, therefore, may be introduced through the boss 23, then inserted through the bearing 25 into the socket in the boss 22. A plug 27 may then be screwed into a suitable tapped opening in the boss 23 to prevent air from passing through the aperture which receives the shaft 24.

By reason of this construction the air valve is pivotally mounted upon the arm which carries the water valve. The pivotal shaft 24 for the air valve desirably is so positioned that the axis of the air valve is located, when the air and water valves are both closed, at the same distance from the center of the pivot 14 as the distance from said center to the axis of the water valve. Therefore, when the valves start to open both the water and air valves swing about a point equidistant from the axes of both valves, so that the force acting upwardly along the line of the axis of the water valve will be balanced by an equal force acting along the line of the axis of the air valve.

When the air and water valves are opened by reason of the release of the air pressure it is desirable that both valves shall be swung out of the water-way and preferably into parallelism with each other and with the direction of flow of the water.

By reason of the pivotal mounting of the air valve upon the arm which carries the water valve this may be accomplished by providing suitable guiding means for positioning the air valve in parallelism with the water valve when the latter is swung to open position. Any suitable means may be provided for accomplishing this purpose. A convenient means is illustrated herein which avoids the use of links or levers and the complications they involve. The preferred means comprises a guide or track 28 formed upon a web 29 preferably carried centrally by the closure 30 of a chamber 31 which extends laterally from the body portion of the casing to receive the valves when in open position. A roller 32, mounted upon a shaft 33, carried by suitable bosses 34 extending from the housing 21, provides suitable means for engaging the track 28. The lower end of the housing 21 likewise is provided with bosses 35 in which is journalled a shaft 36 carrying a roller 37 which engages a track 38 upon a web 39 in the lower portion of the chamber 31. Thus the air valve is guided by the tracks 28 and 38 as the arm 10 is swung to open position and the tracks are so constructed as to guide the air valve about its pivotal shaft 24 until its face is substantially in parallelism with the face of the water valve when the latter is in open position outside the waterway. A suitable stop 40 may also be provided upon the closure 30 to limit the movement of the air valve and hold its face in substantial parallelism with the water-way.

A detent 41, secured to the under side of the housing 21, may be provided to engage the notch or recess 12 in the web 11 of the arm 10 so as to retain the water valve with its face in parallelism with that of the air valve when removing or replacing the valve structure in the casing.

The air valve in the present construction, as is usual in dry pipe constructions, divides the body portion of the dry pipe valve into an upper chamber which receives air under pressure and a lower chamber which is open to the atmosphere, thus enabling the air valve to be held upon its seat by the preponderance of the pressure upon it over that exerted by the water upon the water valve.

In the present invention a drip valve is illustrated of the type disclosed and claimed in my prior Patent No. 1,348,981, granted August 10, 1920. In this construction an aperture is provided through the lower wall of the body portion 1 of the casing in which is seated a bushing 42 provided with a valve seat and webs adapted to receive an extension 43 of a valve 44. The stem 45 of the valve is provided at its upper end with a slot 46 which receives a pin 47 extending laterally from one arm 48 of a lever which is pivotally mounted upon a stud 49 in the casing, the opposite arm 50 of said lever engaging a suitable boss or projection 51 upon the air valve. When the air valve is in the closed position the projection 51 by contact with the arm 50 of the lever maintains the drip valve in an open position. Should the air valve lift slightly when about to trip, this slight movement will permit the arm 50 of the lever to swing into a position directly under the projection 51 and prevents the air valve from reclosing. At the same time the drip valve is allowed to close, and pressure in this chamber is soon built up from the incoming water and the opening of the valve soon follows. By reason of this combined latch and drip valve arrangement the water columning of the air valve is prevented.

A suitable funnel 53, leading to a waste pipe 54, may be located beneath the outlet aperture for said valve to permit any water which accumulates in the lower chamber to drain.

In the operation of the device the valves are normally arranged in the positions illustrated in full lines in Fig. 1, with the water valve closing the end of the inlet member and the air valve seated. When in this position the air pressure upon the upper surface of the air valve will maintain the water valve in closed position so long as a preponderance of air pressure exists. By reason of the greater area of the air valve than that of the water valve a much less air pressure is required than the water pressure to maintain the valves closed. When the air pressure is released by the opening of a sprinkler, or otherwise, the preponderance in pressure of the water will force the water valve from its seat, causing it to swing about the pivot 14 of its arm into the position illustrated in dotted lines in Fig. 1. As the water valve is thus swung to open position the air valve, which is pivoted upon it, is likewise swung about the pivot 14. As this movement of the air valve begins the rollers 32 and 37 engage either the track 28 or 38 and swing the air valve about its pivotal shaft 24, thus moving it relatively to the water valve. A continuation of this movement eventually brings the face of the air valve into substantial parallelism with the face of the water valve and the faces of both valves into a position outside of, and practically parallel to, the main water-way. Further movement of the valves is limited by their engagement with the rear portion of the housing at the stop 40 which is carried by the closure 30 for the casing.

The seat for the closure 30 preferably extends at such an angle to the axis of the casing and is of sufficient area to permit the air valve seat to be machined and finished. This entrance to the valve casing thus also affords sufficient space to enable the introduction of the hand of the operator when the valves are to be seated and avoids the necessity of the separate hand hole usually provided for this purpose.

When it is desired to assemble the valve in the casing, or to remove the same from the casing for the purpose of cleaning or repair, the closure 30 is removed thereby releasing the stop 40 from its engagement with the housing of the air valve, thus permitting the valves to be swung into the position illustrated in the dash line in Fig. 1. When in this position the valves can be withdrawn from the casing inasmuch as the shaft 14 can readily be removed from its slotted bearing. When the valves are to be re-assembled in the casing the extension 17 of the bearing 15 serves to aid in guiding the shaft 14 properly into its bearing. Thus it will be observed a compact, dry pipe valve structure is provided which can be readily assembled or dismantled and which comprises a minimum number of relatively movable parts.

It will be understood that the present embodiment of the invention is illustrative and not restrictive and that various changes in construction and arrangement of parts may be made within the spirit and scope of the following claims.

Having thus described my invention, what I claim as new, and desire to secure by Letters Patent, is:

1. A dry pipe valve comprising a casing having a water valve seat and an air valve seat arranged in angular relation to each other, a water valve and an air valve mounted to swing upon opening about a point substantially equidistant from the axes of both of said valves when in seated position so that equal forces acting along the axes of the water valve and the air valve will be balanced.

2. A dry pipe valve comprising a casing having a water valve seat and an air valve seat arranged in angular relation to each other, a water valve and an air valve movable relatively to said water valve, said valves being mounted to swing upon opening about a point equidistant from the axes of both of said valves when in seated position.

3. A dry pipe valve comprising a casing having a water valve seat and an air valve seat arranged in angular relation to each other, a water valve and an air valve pivotally movable relatively to said water valve, both of said valves being mounted to swing upon opening about a point equidistant from the axes of both of said valves when in closed position.

4. A dry pipe valve comprising a casing provided with a waterway and having a water valve seat and an air valve seat arranged in angular relation to each other, a water valve and an air valve mounted to swing upon opening about a point equidistant from the axes of both of said valves when seated and means pivotally connecting said valves operable to permit said valves to move when fully opened into substantial parallelism, out of said waterway.

5. A dry pipe valve comprising a casing provided with a waterway and having a water valve seat and an air valve seat arranged in angular relation to each other, a water valve and an air valve mounted to swing upon opening about a point equidistant from the axes of both of said valves when seated, means pivotally connecting said valves and guiding means for said air valve acting, when said water valve is swung toward open position, to position said air valve in substantial parallelism with said water valve, outside of the waterway.

6. A dry pipe valve comprising a casing having a straight waterway therethrough, a water valve seat normal to the axis of said waterway, an air valve seat arranged in angular relation to said water valve seat, a water valve, an arm connected to said water valve, a pivot for said arm on said casing, an air valve pivotally mounted on said arm and means for guiding said air valve into substantial parallelism with said water valve when the latter is swung to open position.

7. A dry pipe valve comprising a casing having a waterway therethrough and provided with a water valve seat and an air valve seat arranged in angular relation to each other, a water valve, an arm connected to said water valve, a pivot for said arm on said casing, an air valve pivotally mounted on said arm and tracks on said casing and closure to guide said air valve into parallelism with said water valve when the latter is swung to open position.

8. A dry pipe valve comprising a casing having a waterway therethrough and provided with a water valve seat and an air valve seat arranged in angular relation to each other, a water valve, an arm connected to said water valve, a pivot for said arm on said casing, an air valve pivotally mounted on said arm and tracks on said casing operable to swing said air valve into parallelism with said water valve when the latter is swung to open position and guiding means on said air valve engaging said tracks.

9. A dry pipe valve comprising a casing having a waterway therethrough and provided with a water valve seat and an air valve seat arranged in angular relation to each other, a water valve, an arm connected to said water valve, a pivot for said arm on said casing, an air valve pivotally mounted on said arm, upper and lower tracks on said casing operable to swing said air valve out of said waterway when said water valve is swung to open position and rollers on said air valve positioned to engage the respective tracks.

10. A dry pipe valve comprising a casing having a waterway, a water valve seat and an air valve seat arranged in angular relation to each other, a water valve, an arm connected to said water valve, means pivotally connecting said arm to said casing, an air valve pivotally mounted on said arm and having a diametrically disposed housing forming a chamber to permit free movement of the end of said arm and guiding tracks on said casing acting to position said air valve in parallelism with said water valve when the latter is swung to open position.

11. A dry pipe valve comprising a casing having a waterway, a water valve seat and an air valve seat arranged in angular relation to each other, a water valve, an arm connected to said water valve, means pivotally connecting said arm to said casing, an air valve pivotally mounted on said arm and having a diametrically disposed housing forming a chamber to permit free movement of the end of said arm, guides on said casing acting to position said air valve in parallelism with said water valve when the latter is swung to open position and a detent in said housing adapted to engage the end of said arm and retain said valves in parallelism when in open position.

12. A dry pipe valve comprising a casing having a waterway therethrough, a water valve seat and an air valve seat arranged in angular relation to each other, a water valve, an arm connected to said water valve, a pivot for said arm upon said casing, an air valve pivotally mounted on said arm, means for directing said air valve into parallelism with said water valve when the latter is moved to open position and means for retaining said valves in parallelism when in open position.

13. A dry pipe valve comprising a casing having a waterway therethrough, a water valve seat and an air valve seat arranged in angular relation to each other, a water valve, an arm connected to said water valve, a pivot for said arm upon said casing, an air valve pivotally mounted on said arm, means for moving said air valve into parallelism with said water valve when the latter is moved to open position and means for retaining said valves in parallelism when in open position comprising a co-operating detent and recess upon the air valve and arm respectively.

14. A dry pipe valve comprising a casing having a waterway, and a valve chamber at the side of said waterway having a removable closure, a water valve seat, an air valve seat, an arm carrying the water and air valves, a pivotal shaft for said arm, slotted bearings in said casing to receive said pivotal shaft adapted to permit withdrawal of said valves from said casing when said closure is removed.

15. A dry pipe valve comprising a casing having a waterway, a valve chamber at the side of the waterway having a removable closure, a water valve seat and an air valve seat arranged in angular relation to each other, a water valve, an arm carrying said water valve, an air valve pivotally mounted on said arm, a pivotal shaft for said arm and a slotted bearing for said shaft adapted to permit the withdrawal of the valves from the casing upon removal of the closure.

16. A dry pipe valve comprising a casing having a converging inlet passage provided at its end with a water valve seat, an air valve seat in angular relation to said water valve seat, a water valve and an air valve mounted to swing upon opening about a point equidistant from the axes of both of said valves when in seated position.

In testimony whereof, I have signed my name to this specification.

EZRA E. CLARK.